United States Patent
Zhao et al.

(10) Patent No.: US 11,652,737 B2
(45) Date of Patent: May 16, 2023

(54) ROUTE RECURSION CONTROL METHOD, DEVICE, AND SYSTEM

(71) Applicant: Huawei Technologies Co., Ltd., Shenzhen (CN)

(72) Inventors: Jingjing Zhao, Shenzhen (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/367,008

(22) Filed: Jul. 2, 2021

(65) Prior Publication Data

US 2021/0336870 A1    Oct. 28, 2021

Related U.S. Application Data

(63) Continuation of application No. PCT/CN2019/070685, filed on Jan. 7, 2019.

(51) Int. Cl.
*H04L 12/46* (2006.01)
*H04L 12/723* (2013.01)
(Continued)

(52) U.S. Cl.
CPC .......... *H04L 45/20* (2013.01); *H04L 12/4633* (2013.01); *H04L 45/02* (2013.01);
(Continued)

(58) Field of Classification Search
CPC ..... H04L 14/20; H04L 12/4633; H04L 45/02; H04L 45/50; H04L 45/745; H04L 47/125; H04L 61/251; H04L 45/34; H04L 45/64
(Continued)

(56) References Cited

U.S. PATENT DOCUMENTS 6,512,487 B1    1/2003  Taylor et al.
7,369,556 B1 *  5/2008  Rekhter ............... H04L 12/465
                                                    370/410
(Continued)

FOREIGN PATENT DOCUMENTS

CN    101155118 A    4/2008
CN    101340374 A    1/2009
(Continued)

OTHER PUBLICATIONS

Y. Rekhter, Ed. et al, "A Border Gateway Protocol 4 (BGP-4)," RFC 4271, Jan. 2006, 104 pages.
(Continued)

*Primary Examiner* — Younes Naji
*Assistant Examiner* — Da T Ton
(74) *Attorney, Agent, or Firm* — Conley Rose, P.C.

(57) ABSTRACT

A route recursion control method includes a first network device that receives Border Gateway Protocol (BGP) routing information from a second network device. The BGP routing information includes a destination address, a next-hop address for the destination address, and attribute information. The attribute information indicates a manner of performing route recursion on the next-hop address by the first network device. The first network device determines, based on the attribute information, the manner of performing the route recursion on the next-hop address.

20 Claims, 9 Drawing Sheets

(51) Int. Cl.
  *H04L 12/733*  (2013.01)
  *H04L 45/00*   (2022.01)
  *H04L 45/02*   (2022.01)
  *H04L 45/50*   (2022.01)
  *H04L 45/745*  (2022.01)
  *H04L 47/125*  (2022.01)
  *H04L 61/251*  (2022.01)

(52) U.S. Cl.
  CPC ............ *H04L 45/50* (2013.01); *H04L 45/745* (2013.01); *H04L 47/125* (2013.01); *H04L 61/251* (2013.01)

(58) Field of Classification Search
  USPC .......................................................... 709/238
  See application file for complete search history.

(56) References Cited

U.S. PATENT DOCUMENTS

| | | |
|---|---|---|
| 7,423,974 B2 | 9/2008 | Raut |
| 2004/0177157 A1 | 9/2004 | Mistry et al. |
| 2005/0243839 A1 | 11/2005 | Raut |
| 2007/0112975 A1* | 5/2007 | Cassar .................... H04L 45/16 709/239 |
| 2015/0304206 A1* | 10/2015 | Filsfils .................... H04L 45/46 709/238 |
| 2019/0109387 A1 | 4/2019 | Samadi Taheri et al. |

FOREIGN PATENT DOCUMENTS

| | | |
|---|---|---|
| CN | 102594657 A | 7/2012 |
| CN | 105721305 A | 6/2016 |
| CN | 106878177 A | 6/2017 |
| CN | 107017470 A | 8/2017 |
| CN | 108259205 A | 7/2018 |
| CN | 108900413 A | 11/2018 |
| WO | 2018054159 A1 | 3/2018 |
| WO | 2018160881 A1 | 9/2018 |

OTHER PUBLICATIONS

S. Sangli et al, "BGP Extended Communities Attribute," RFC 4360, Feb. 2006, 12 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type (type)          |   Flags (flags)   | Reserved (reserved) |
+-+-+-+-+-+-+-+-+-+-+-+-+-+-+-+-+-+-+-+-+-+-+-+-+-+-+-+-+-+-+-+-+
|                          Value (value)                          |
+-+-+-+-+-+-+-+-+-+-+-+-+-+-+-+-+-+-+-+-+-+-+-+-+-+-+-+-+-+-+-+-+
```

FIG. 3

ROUTE RECURSION CONTROL METHOD, DEVICE, AND SYSTEM

CROSS-REFERENCE TO RELATED APPLICATIONS

This is a continuation of International Patent Application No. PCT/CN2019/070685 filed on Jan. 7, 2019, which is hereby incorporated by reference in its entirety.

TECHNICAL FIELD

This application relates to the communications field, and in particular, to a route recursion method, a device, and a system.

BACKGROUND

The Borer Gateway Protocol (BGP) is an inter-autonomous system (AS) routing protocol, and is used to exchange routing information between different autonomous systems. After receiving an advertisement of BGP routing information, a network device needs to perform route recursion on a next-hop address. Only when it is determined that the route recursion succeeds, the BGP routing information is delivered from a control plane to a forwarding plane to guide forwarding, and the BGP routing information may continue to be advertised to another network device. When the route recursion fails, the BGP routing information is not used to guide forwarding, and the BGP routing information stops being advertised to another network device.

However, route recursion policies are manually configured on network devices one by one in a network. This is complex, time-consuming, labor-intensive, and error-prone.

SUMMARY

A route recursion control method, a device, and a system provided in embodiments of the present disclosure resolve a problem that manual configuration of route recursion policies one by one in a network is complex, time-consuming, labor-intensive, and error-prone, and help simplify network operation and maintenance, reduce labor costs, and improve network management accuracy and efficiency.

According to a first aspect, an embodiment of this application provides a route recursion control method. According to the method, a first network device receives border gateway protocol BGP routing information from a second network device. The BGP routing information includes a destination address, a next-hop address for the destination address, and attribute information, and the attribute information indicates a manner of performing route recursion on the next-hop address by the first network device. The first network device determines, based on the attribute information, the manner of performing the route recursion on the next-hop address.

The advertised BGP routing information carries the attribute information used to control a route recursion manner, so that the attribute information is spread to a related network device in a network along with the advertised BGP routing message, to avoid a problem that manual configuration of a route recursion policy on each network device is complex and error-prone. In this way, labor costs are reduced, and network management accuracy and efficiency are improved.

In a possible design, when the attribute information indicates not to perform the route recursion on the next-hop address, the first network device does not perform the route recursion on the next-hop address.

In an application scenario in which an inter-domain end-to-end tunnel bears a service, after receiving BGP routing information from an upstream network device and before continuing to advertise the BGP routing information to a downstream network device, a non-border network device in an inter-domain network does not perform the route recursion on the next-hop address based on the indication of the attribute information, to avoid termination of advertisement of the BGP routing information due to a route recursion failure, so that a service is normally created.

In a possible design, when the attribute information indicates to perform Internet Protocol (IP) recursion on the next-hop address, the first network device performs the IP recursion on the next-hop address, where the IP recursion includes common IP recursion or flow specification (FlowSpec) route recursion.

The advertised BGP routing information carries the indication to perform the IP recursion on the next-hop address, to avoid a problem that manual configuration of IP recursion on each network device is complex and error-prone. In this way, labor costs of IP recursion configuration are reduced, and network management accuracy and efficiency are improved.

In a possible design, when the attribute information indicates to perform tunnel recursion on the next-hop address, the first network device performs the tunnel recursion on the next-hop address, where the tunnel recursion includes multi-protocol label switching (MPLS) label switched path (LSP) tunnel recursion, resource reservation protocol-traffic engineering (RSVP-TE) tunnel recursion, segment routing-traffic engineering (SR-TE) tunnel recursion, segment routing-best effort (SR-BE) tunnel recursion, generic routing encapsulation (GRE) tunnel, an IP version 4 (IPv4) tunnel, or an IP version 6 (IPv6) tunnel.

The advertised BGP routing information carries the indication to perform the tunnel recursion on the next-hop address, to avoid a problem that manual configuration of tunnel recursion on each network device is complex and error-prone. In this way, labor costs of tunnel recursion configuration are reduced, and network management accuracy and efficiency are improved.

In a possible design, when the attribute information indicates to perform IP recursion and tunnel recursion on the next-hop address, the first network device performs the IP recursion and the tunnel recursion on the next-hop address, where the IP recursion includes common IP recursion or FlowSpec route recursion, and the tunnel recursion includes MPLS LSP tunnel recursion, RSVP-TE tunnel recursion, SR-TE tunnel recursion, SR-BE tunnel recursion, GRE tunnel recursion, IPv4 tunnel recursion, or IPv6 tunnel recursion.

The advertised BGP routing information carries the indication to perform the IP recursion and the tunnel recursion on the next-hop address, to avoid a problem that manual configuration of IP recursion and tunnel recursion on each network device is complex and error-prone. In this way, labor costs of IP recursion and tunnel recursion configuration are reduced, and network management accuracy and efficiency are improved.

Further, by classifying the attribute information into the IP recursion, the tunnel recursion, the IP recursion and the tunnel recursion, and no recursion, various route recursion manners are flexibly implemented, thereby improving route recursion flexibility.

In a possible design, the attribute information is a BGP extended communities attribute, and the BGP extended communities attribute includes a type field and a flag field. The type field indicates to control the route recursion of the next-hop address, the flag field controls the manner of performing the route recursion on the next-hop address, and the manner includes any one of the following: no recursion, the IP recursion, the tunnel recursion, and the IP recursion and the tunnel recursion.

By extending a new type in the BGP extended communities attribute to control the route recursion manner, a simple method with good scalability is provided. This helps to implement the disclosure solution easily and has good compatibility.

In a possible design, the BGP extended communities attribute further includes a first value field and a second value field. The first value field indicates a type of the IP recursion, and the type of the IP recursion includes the common IP recursion or the FlowSpec route recursion. The second value field indicates a type of the tunnel recursion, and the tunnel recursion includes the MPLS LSP tunnel recursion, the RSVP-TE tunnel recursion, the SR-TE tunnel recursion, the SR-BE tunnel recursion, the GRE tunnel recursion, the IPv4 tunnel recursion, or the IPv6 tunnel recursion.

A specific type of the IP recursion or the tunnel recursion may be precisely controlled by using the value fields. By further dividing the value field into the first value field and the second value field, the specific type of the IP recursion or the tunnel recursion may be separately controlled, and specific types of both the IP recursion and the tunnel recursion may also be precisely controlled, improving preciseness of route recursion control.

According to a second aspect, an embodiment of this application provides a route recursion control method. According to the method, a second network device obtains border gateway protocol BGP routing information. The BGP routing information includes a destination address, a next-hop address for the destination address, and attribute information, where the attribute information indicates a manner of performing route recursion on the next-hop address by a first network device. The second network device sends the BGP routing information to the first network device.

The advertised BGP routing information carries the attribute information used to control the route recursion manner, so that the attribute information is spread to a related network device in a network along with the advertised BGP routing message, to avoid a problem that manual configuration of a route recursion policy on each network device is complex and error-prone. In this way, labor costs are reduced, and network management accuracy and efficiency are improved.

In a possible design, the manner of performing route recursion on the next-hop address includes one of the following manners: not performing the route recursion on the next-hop address; performing IP recursion on the next-hop address, where the IP recursion includes common IP recursion or FlowSpec route recursion; performing tunnel recursion on the next-hop address, where the tunnel recursion includes MPLS LSP tunnel recursion, RSVP-TE tunnel recursion, SR-TE tunnel recursion, SR-BE tunnel recursion, GRE tunnel recursion, IPv4 tunnel recursion, or IPv6 tunnel recursion; and performing the IP recursion and the tunnel recursion on the next-hop address.

By classifying attribute information into IP recursion, tunnel recursion, the IP recursion and the tunnel recursion, and no recursion, various route recursion manners are flexibly implemented, thereby improving route recursion flexibility.

In a possible design, the attribute information is a BGP extended communities attribute, and the BGP extended communities attribute includes a type field and a flag field. The type field indicates to control the route recursion of the next-hop address, the flag field controls the manner of performing the route recursion on the next-hop address, and the manner includes any one of the following: no recursion, the IP recursion, the tunnel recursion, and the IP recursion and the tunnel recursion.

By extending a new type in BGP extended communities attribute to control the route recursion manner, a simple method with good scalability is provided. This helps to implement the disclosure solution easily and has good compatibility.

In a possible design, the BGP extended communities attribute further includes a first value field and a second value field. The first value field indicates a type of the IP recursion, and the type of the IP recursion includes the common IP recursion or the FlowSpec route recursion. The second value field indicates a type of the tunnel recursion, and the tunnel recursion includes the MPLS LSP tunnel recursion, the RSVP-TE tunnel recursion, the SR-TE tunnel recursion, the SR-BE tunnel recursion, the GRE tunnel recursion, the IPv4 tunnel recursion, or the IPv6 tunnel recursion.

A specific type of the IP recursion or the tunnel recursion may be precisely controlled by using the value fields. By further dividing the value field into the first value field and the second value field, the specific type of the IP recursion or the tunnel recursion may be separately controlled, and specific types of both the IP recursion and the tunnel recursion may also be precisely controlled, improving preciseness of route recursion control.

In a possible design, before the second network device obtains the BGP routing information, the method further includes the second network device obtains policy information, where the policy information indicates the second network device to add the attribute information to the BGP routing information to be advertised to the first network device.

The policy information provides a function (or capability) of enabling (or activating), based on a customer requirement, to add the attribute information to the BGP routing information. This helps to manage or use a network as required and improve network management flexibility.

In a possible design, that a second network device obtains the BGP routing information includes: The second network device obtains the BGP routing information based on the indication of the policy information.

The attribute information is added to the to-be-advertised BGP routing information based on the indication of the policy information. This helps to manage a network as required and improve network management flexibility.

In a possible design, the policy information further includes specified address information, where the specified address information indicates an address set. Correspondingly, the policy information indicates the second network device to add the attribute information to BGP routing information that includes a destination address in the address set and that is to be advertised to the first network device.

The policy information includes the specified address information, so that route recursion control may be performed on a BGP route within a specific address range, thereby enriching technical implementation means and improving flexibility of use.

In a possible design, that a second network device obtains the BGP routing information includes: The second network device obtains the BGP routing information based on the indication of the policy information when it is determined that the destination address is in the address set.

The attribute information is added, based on an indication of policy information, to the to-be-advertised BGP routing information that meets a requirement. This helps to manage a network as required and improve network management flexibility.

In a possible design, the second network device obtains the policy information in at least one of the following manners: The second network device obtains the policy information based on command line configuration; the second network device receives a message form a control and management device, where the message includes the policy information; and the second network device runs algorithm software to automatically generate the policy information.

A plurality of manners of obtaining the policy information are provided, thereby enriching technical implementation means and improving usability.

According to a third aspect, an embodiment of this application provides a route recursion control method. According to the method, a control and management device generates a message, where the message includes policy information, and the information indicates a second network device to add attribute information to border gateway protocol BGP routing information to be advertised to a first network device. The BGP routing information includes a destination address, a next-hop address for the destination address, and attribute information. The attribute information indicates a manner of performing route recursion on the next-hop address by the first network device. The control and management device sends the message to the second network device.

The policy information provides a function (or capability) of enabling (or activating) to add the attribute information to the BGP routing information based on a user requirement. This helps to manage or use a network as required and improve network management flexibility.

In a possible design, the policy information further includes specified address information, where the specified address information indicates an address set. Correspondingly, the policy information indicates the second network device to add the attribute information to BGP routing information that includes a destination address in the address set and that is to be advertised to the first network device.

The policy information includes the specified address information, so that route recursion control may be performed on a BGP route within a specific address range, thereby enriching technical implementation means and improving flexibility of use.

According to a fourth aspect, an embodiment of this application provides a network device that is used as a first network device. The first network device includes a memory and a processor connected to the memory. The processor is configured to execute a computer-readable instruction in the memory, to perform the method in any one of the first aspect or possible implementations of the first aspect.

According to a fifth aspect, the present disclosure provides a computer-readable medium, including an instruction. When the instruction is run on a computer, the computer is enabled to perform the method in any one of the first aspect or possible implementations of the first aspect.

According to a sixth aspect, an embodiment of this application provides a network device that is used as a second network device. The second network device includes a memory and a processor connected to the memory. The processor is configured to execute a computer-readable instruction in the memory, to perform the method in any one of the second aspect or possible implementations of the second aspect.

According to a seventh aspect, the present disclosure provides a computer-readable medium, including an instruction. When the instruction is run on a computer, the computer is enabled to perform the method in any one of the second aspect or possible implementations of the second aspect.

According to an eighth aspect, an embodiment of this application provides a control and management device. The control and management device includes a memory and a processor connected to the memory. The processor is configured to execute a computer-readable instruction in the memory, to perform the method in any one of the third aspect or possible implementations of the third aspect.

According to a ninth aspect, the present disclosure provides a computer-readable medium, including an instruction. When the instruction is run on a computer, the computer is enabled to perform the method in any one of the third aspect or possible implementations of the third aspect.

According to a tenth aspect, the present disclosure provides a system. The system includes the first network device according to the fourth aspect or the fifth aspect and the second network device according to the sixth aspect or the seventh aspect.

According to an eleventh aspect, the present disclosure provides a system. The system includes the second network device according to the sixth aspect or the seventh aspect and the control and management device according to the eighth aspect or the ninth aspect.

BRIEF DESCRIPTION OF DRAWINGS

To describe the technical solutions in the embodiments of this application more clearly, the following briefly introduces the accompanying drawings for describing the embodiments. It is clearly that the accompanying drawings in the following description show merely some embodiments recorded in this application, and a person of ordinary skill in the art may still derive other drawings from these accompanying drawings.

FIG. 3 is a schematic diagram of a field format according to an embodiment of this application;

DESCRIPTION OF EMBODIMENTS

The technical solutions in the embodiments of the present disclosure are clearly and completely described in the following with reference to the accompanying drawings. It is clearly that the described embodiments are a part rather than all of the embodiments of the present disclosure. All other embodiments obtained by a person of ordinary skill in the art based on the embodiments of the present disclosure without creative efforts shall fall within the protection scope of the present disclosure.

A network architecture and a service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may learn that with the evolution of the network architecture and the emergence of new service scenarios, the technical solutions provided in the embodiments of the present disclosure are also applicable to similar technical problems.

Before the technical solutions of the embodiments of the present disclosure are described, an application scenario of the embodiments of the present disclosure is first described as an example. The present disclosure is applied to a network in which route advertisement is performed by using a BGP. The network includes a network device. The network device is a device that performs a route forwarding function, and may be a device such as a router, a switch, or a forwarder. The router, the switch, and the forwarder may be physical devices, or may be virtual devices (such as a virtual server, a virtual router, a virtual switch, or a virtual forwarder) implemented based on a virtualization technology. Based on a location and a role of the network device deployed in the network, the network device may also be referred to as a provider edge (PE) device, a customer edge (CE) device, a route reflector (RR), an autonomous system border router (ASBR), and the like.

Figure 1:
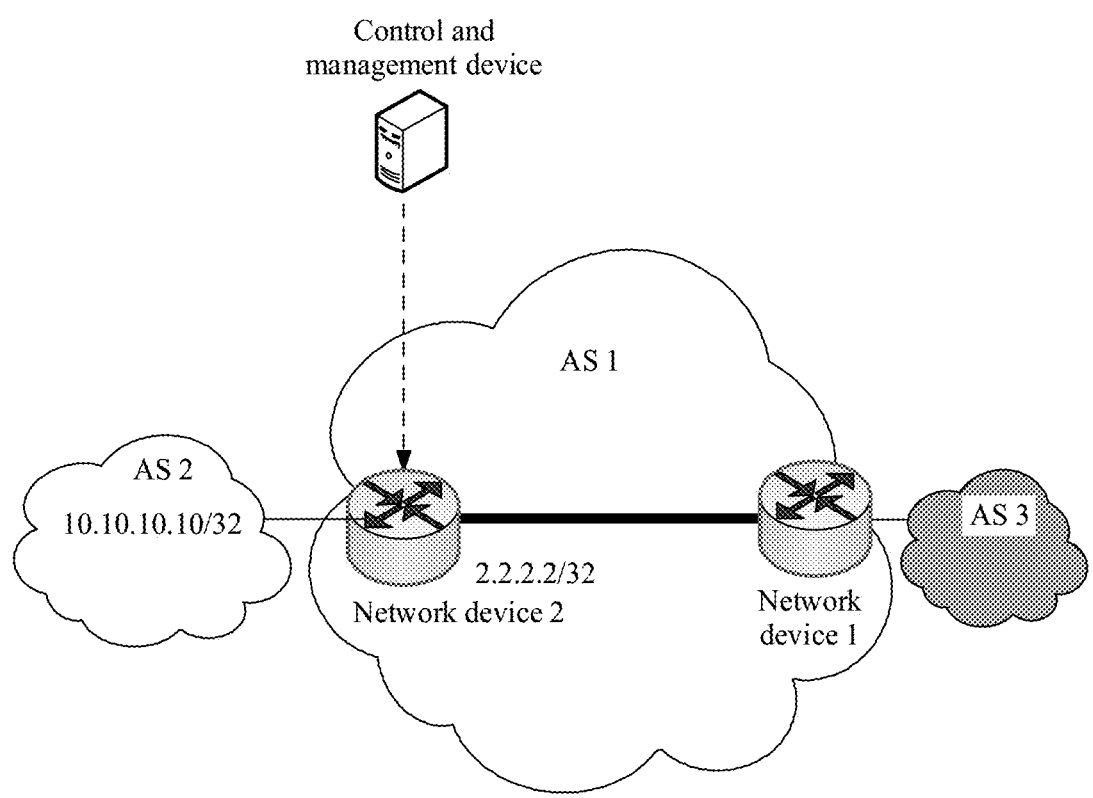
FIG. 1 is a schematic diagram of a network application scenario according to an embodiment of this application.

FIG. 1 is a schematic diagram of an application scenario of a BGP route advertisement. The application scenario includes three ASs: an AS 1, an AS 2, and an AS 3. The AS 1 includes a network device 1 and a network device 2. The AS 1, the AS 2, and the AS 3 perform inter-autonomous system routing information advertisement by using a BGP. BGP routing information includes a destination address and a next-hop address for the destination address. For example, the destination may be carried in a multiprotocol reachable network layer reachability information (MP_REACH_NLRI) attribute defined by the BGP, and the next-hop address may be carried in a next-hop (NEXT_HOP) attribute defined by the BGP. For details about the MP_REACH_NLRI attribute and the NEXT_HOP attribute, refer to request for comments (RFC) 4271 released by the International Internet Engineering Task Force (IETF). Contents of this document and parts related to this aspect seem to be copied as a whole, and are incorporated by reference into this document. For a description of a contradiction or conflict that the document has with this application, a description of this application shall prevail. In this specification, for brevity, details are not described herein. The destination address may be an IPv4 address, an IPv4 prefix, an IPv6 address, or an IPv6 prefix, or may be a virtual private network (VPN) address (private network address), for example, a VPN-IPv4 address, a VPN-IPv6 address, a media access control (MAC) address in an Ethernet virtual private network (EVPN). Alternatively, the destination address may be an address in another form. This is not limited herein.

In FIG. 1, after the network device 2 receives a piece of BGP routing information (for example, a destination address is an IPv4 address: 10.10.10.10/32) advertisement from the AS 2, and after route recursion succeeds, the network device 2 changes a next-hop address in the BGP routing information to its own address (to be specific, an address of the network device 2), and continues to advertise the BGP routing information to the AS 3. It should be noted that, the route recursion refers to recursive route lookup, and is specifically an operation of recursive route lookup performed for an IP address in the NEXT_HOP attribute. The recursive route lookup includes recursive IP lookup and recursive tunnel lookup. When a network device receives BGP routing information, if an IP address in a NEXT_HOP attribute is a next-hop address indirectly connected to the network device, recursive route lookup needs to be performed on the IP address in the NEXT_HOP attribute to determine a direct (immediate or direct) next-hop address (that is, recursive IP lookup) or a tunnel identifier (that is, recursive tunnel lookup), to determine whether a route to the IP address in the NEXT_HOP attribute is reachable.

The route recursion can be classified into IP recursion and tunnel recursion. The IP recursion refers to the recursive IP lookup. To be specific, recursive route lookup is performed on the IP address in the NEXT_HOP attribute to determine the direct next-hop address. The IP recursion includes common IP recursion or FlowSpec route recursion. The common IP recursion is to look up an IP routing table generated by a dynamic routing protocol or a static routing protocol such as an Interior Gateway Protocol (IGP) or a BGP during the recursive IP lookup. The FlowSpec route recursion is to look up a FlowSpec routing table generated by a FlowSpec protocol during the recursive IP lookup. The tunnel recursion refers to the recursive tunnel lookup. To be specific, recursive route lookup is performed on the IP address in the NEXT_HOP attribute to determine the tunnel identifier. The tunnel identifier is used to identify one tunnel or a plurality of tunnels (for example, a plurality of tunnels is used for load balancing). The tunnel recursion includes recursion of various types of tunnels, and usually includes, but is not limited to, MPLS LSP tunnel recursion, resource reservation protocol-traffic engineering (RSVP-TE) tunnel recursion, SR-TE tunnel recursion, SR-BE tunnel recursion, GRE tunnel recursion, IPv4 tunnel recursion, or IPv6 tunnel recursion. The MPLS LSP tunnel recursion is to look up a tunnel table (or a tunnel list) generated by an MPLS LSP protocol during the recursive tunnel lookup. In a similar way, the RSVP-TE tunnel recursion, the SR-TE tunnel recursion, the SR-BE tunnel recursion, the GRE tunnel recursion, the IPv4 tunnel recursion, or the IPv6 tunnel recursion is to search respectively in a tunnel table (or a tunnel list) generated by an RSVP-TE protocol, an SR-TE protocol, an SR-BE protocol, a GRE protocol, an IPv4 protocol, or an IPv6 protocol during the recursive tunnel lookup.

The embodiments of the present disclosure provide a route recursion control method. Advertised BGP routing information carries attribute information used to control a route recursion manner, so that the attribute information is spread to a related network device in a network along with the advertised BGP routing message, to avoid a problem that manual configuration of a route recursion policy on each network device is complex and error-prone. In this way, labor costs are reduced, and network management accuracy and efficiency are improved.

The following further describes the embodiments of the present disclosure in detail based on the application scenario in FIG. 1. In the following, a first network device in FIG. 2 may be the network device 1 in FIG. 1, a second network device in FIG. 2 may be the network device 2 in FIG. 1, and a control and management device in FIG. 2 may be a control and management device in FIG. 1.

Figure 2:
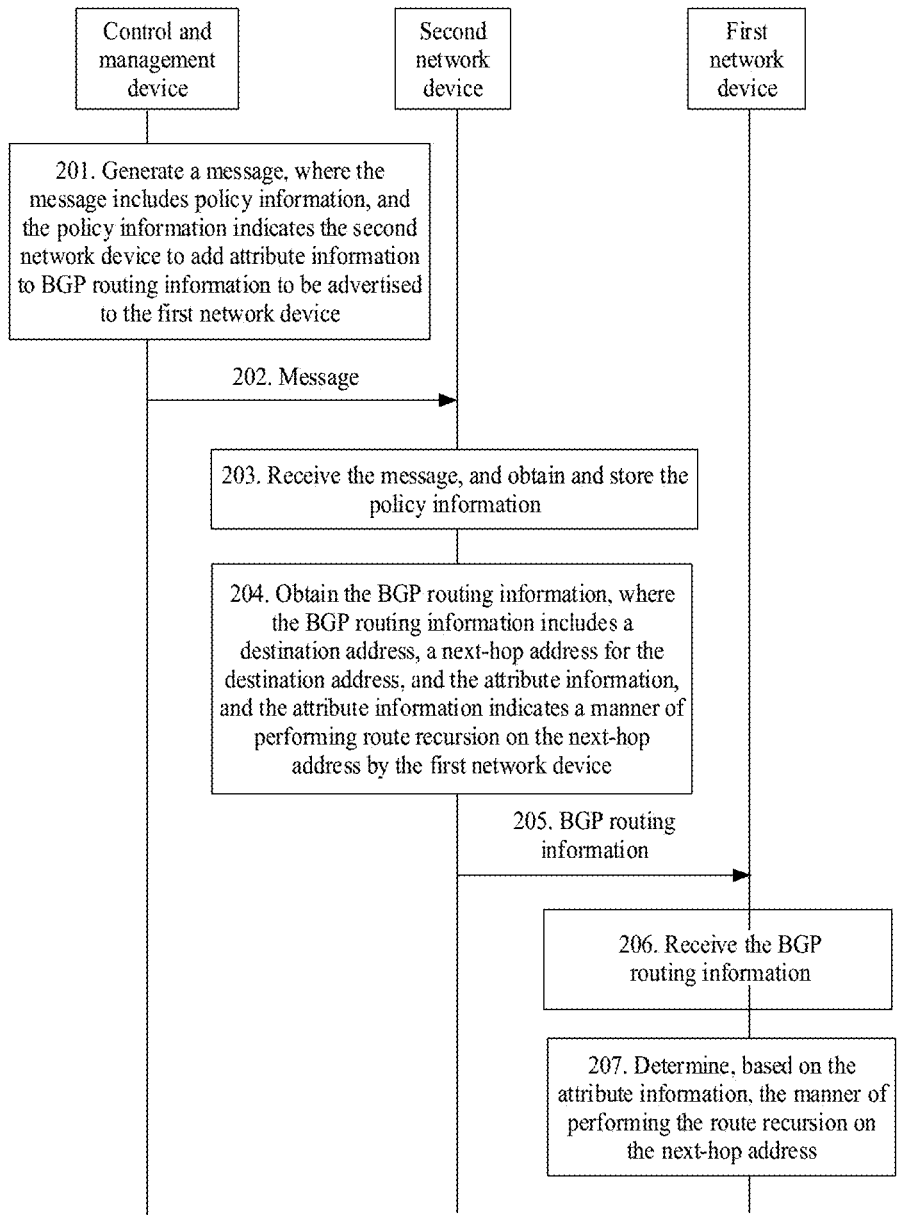
FIG. 2 is a flowchart of a route recursion control method according to an embodiment of this application.

FIG. 2 is a flowchart of a route recursion control method according to an embodiment of the present disclosure. The method includes the following content.

201: The control and management device generates a message, where the message includes policy information, and the policy information indicates the second network device to add attribute information to BGP routing information to be advertised to the first network device. The BGP routing information includes a destination address, a next-hop address for the destination address, and the attribute information. The attribute information indicates a manner of performing route recursion on the next-hop address by the first network device.

202: The control and management device sends the message to the second network device.

203: The second network device receives the message, and obtains and stores the policy information.

FIG. 1 is used as an example. The control and management device generates and sends a message to the network device 2 based on a user requirement. The network device 2 receives the message, and obtains policy information from the message. The policy information indicates the network device 2 to add attribute information to BGP routing information to be advertised to the network device 1. The attribute information indicates a manner of performing route recursion on a next-hop address (for example, an address of the network device 2) in the BGP routing information by the network device 1. It should be noted that a user is an operator, a manager, or a user of a network. The user requirement may be a requirement for using a network, managing a network, or the like. The user requirement may be manually configured and entered on the control and management device, or may be automatically obtained by the control and management device after the control and management device receives a requirement message from another application server (for example, a third-party application server), or may be obtained in another manner. This is not limited in this specification.

A function (or capability) of enabling (or activating) to add the attribute information to the BGP routing information based on a user requirement is provided by using the policy information. This helps to manage or use a network as required and improve network management flexibility.

In a specific embodiment, the policy information further includes specified address information, and the specified address information indicates an address set. Correspondingly, the policy information indicates the second network device to add the attribute information to BGP routing information that includes a destination address in the address set and that is to be advertised to the first network device.

The second network device adds, based on the indication of the policy information, the attribute information to the BGP routing information that includes the destination address in the address set and that is to be advertised to the first network device.

FIG. 1 is used as an example. A destination address that the network device 2 needs to advertise to the network device 1 is 10.10.10.10/32. If the address set is {10.10.10.10/32, 50.1.1.1/32, 60.1.1.1/32, . . . }, the destination address is in the address set. Therefore, the network device 2 receives a message form the control and management device, and obtains policy information from the message. The policy information indicates the network device 2 to add the attribute information to the BGP routing information that includes the destination address in the address set and that is to be advertised to the network device 1. The attribute information indicates the manner of performing the route recursion on the next-hop address (for example, the address of the network device 2) in the BGP routing information by the network device 1. When it is determined that the destination address (10.10.10.10/32) is in the address set, the network device 2 adds, based on the indication of the policy information, the attribute information to the BGP routing information that includes the destination address 10.10.10.10/32.

The policy information includes the specified address information, so that route recursion control may be performed on a BGP route within a specific address range, thereby enriching technical implementation means and improving flexibility of use.

It should be noted that the message may be sent through a management channel, or may be sent over a control channel protocol. Currently, commonly used management channel protocols may include, for example, a Simple Network Management Protocol (SNMP) and a Network Configuration Protocol (NETCONF). Currently, commonly used control channel protocols may include, for example, an OpenFlow protocol, a Path Computation Element Communication Protocol (PCEP), a BGP, and an interface to the routing system (I2RS) protocol.

It should be further noted that, in addition to obtaining the policy information by receiving the message from the control and management device, the first network device may further obtain the policy information in at least one of the following manners:

(1) The first network device obtains the policy information based on command line configuration. For example, an administrator logs in to the first network device to perform a configuration operation by using a command line.

(2) The first network device runs algorithm software to automatically generate the policy information.

A plurality of manners of obtaining the policy information are provided, thereby enriching technical implementation means and improving usability.

204: The second network device obtains the BGP routing information, where the BGP routing information includes the destination address, the next-hop address for the destination address, and the attribute information, and the attribute information indicates the manner of performing the route recursion on the next-hop address by the first network device.

The second network device may obtain the BGP routing information (carrying the attribute information) in a plurality of manners, for example:

Manner 1: The second network device is a starting device that initiates advertisement of the BGP routing information.

In this case, the second network device generates the BGP routing information that carries the attribute information.

Manner 2: The second network device serves as a transit node, and after receiving BGP routing information that does not carry the attribute information (to be specific, transited BGP routing information) from another network device, the second network device adds the attribute information to the transited BGP routing information to continue to advertise the BGP routing information. The transited BGP routing information carries the attribute information.

In a specific embodiment, the second network device may directly obtain the BGP routing information based on an execution operation of software code. In addition, the second network device may first obtain the policy information, and then obtain the BGP routing information based on the policy information. For example, the second network device generates, based on the policy information, new BGP routing information that carries the attribute information, or adds the attribute information to to-be-transited BGP routing information. For a manner of obtaining the policy information and a definition of the policy information, refer to the foregoing descriptions in 201 to 203. For brevity, details are not described again.

FIG. 1 is used as an example. When receiving a route advertisement from an IP address (for example, 10.10.10.10/32) of the AS 2, the network device 2 may directly add attribute information to the BGP routing information, or add attribute information to the BGP routing information based on policy information. The BGP routing information includes a destination address (which is 10.10.10.10/32), a next-hop address (which is the address of the network device 2, for example, 2.2.2.2/32) for the destination address, and the attribute information. The attribute information indicates the manner of performing route recursion on the next-hop address (2.2.2.2/32) by the network device 1. In addition, when the network device 2, as a start device of the route advertisement, initiates an advertisement on an IP address (for example, 80.1.1.1/32), the network device 2 may directly add attribute information to the BGP routing information, or generate BGP routing information that carries the attribute information. The BGP routing information includes a destination address (80.1.1.1/32), a next-hop address (2.2.2.2/32) for the destination address, and the attribute information.

The attribute information is added to the to-be-advertised BGP routing information based on the indication of the policy information. This helps to manage a network as required and improve network management flexibility.

In a word, the advertised BGP routing information carries the attribute information, so that a route recursion policy is spread to each corresponding network device with advertisement of the BGP routing information. In this way, a route recursion policy only needs to be configured on one or a few network devices. This reduces manual configuration and improves efficiency and accuracy. As shown in FIG. 1, configuration needs to be performed only on the network device 2, and similar configuration does not need to be performed on the network device 1, thereby reducing manual configuration and costs.

In another specific embodiment, a manner in which the attribute information indicates the first network device to perform the route recursion on the next-hop address includes but is not limited to the following manners. For a definition of the route recursion, refer to the foregoing descriptions in FIG. 1. For brevity, details are not described again.

(1) IP recursion is performed on the next-hop address. The IP recursion includes common IP recursion or FlowSpec route recursion. FIG. 1 is used as an example. The network device 1 looks up the IP routing table or the FlowSpec routing table for the address (the next-hop address) of the network device 2. If a matched entry is found, common IP recursion or FlowSpec route recursion lookup succeeds. If no matched entry is found, the common IP recursion or FlowSpec route recursion lookup fails.

The advertised BGP routing information carries an indication to perform the IP recursion on the next-hop address, to avoid a problem that manual configuration of IP recursion on each network device is complex and error-prone. In this way, labor costs of IP recursion configuration are reduced, and network management accuracy and efficiency are improved.

(2) Tunnel recursion is performed on the next-hop address. The tunnel recursion includes MPLS LSP tunnel recursion, RSVP-TE tunnel recursion, SR-TE tunnel recursion, SR-BE tunnel recursion, GRE tunnel recursion, IPv4 tunnel recursion, or IPv6 tunnel recursion. FIG. 1 is used as an example. The network device 1 looks up an MPLS tunnel table, an RSVP-TE tunnel table, an SR-TE tunnel table, an SR-BE tunnel table, a GRE tunnel table, an IPv4 tunnel table, or an IPv6 tunnel table for the address (the next-hop address) of the network device 2. If a matched entry is found, corresponding tunnel recursion lookup succeeds. If no matched entry is found, the corresponding tunnel recursion lookup fails.

The advertised BGP routing information carries an indication to perform the tunnel recursion on a next-hop address, to avoid a problem that manual configuration of tunnel recursion on each network device is complex and error-prone. In this way, labor costs of tunnel recursion configuration are reduced, and network management accuracy and efficiency are improved.

(3) The IP recursion and the tunnel recursion are performed on the next-hop address. That is, both the IP recursion and the tunnel recursion are performed. FIG. 1 is used as an example. The network device 1 uses the address (the next-hop address) of the network device 2 to perform the IP recursion lookup described in the manner (1), and also performs the tunnel recursion lookup described in the manner (2). If both the two types of recursion lookup succeed, the network device 1 determines that the IP recursion and the tunnel recursion succeed. If at least one of the two types of recursion lookup fails, the network device 1 determines that the IP recursion and the tunnel recursion fail.

The advertised BGP routing information carries an indication to perform the IP recursion and the tunnel recursion on the next-hop address, to avoid a problem that manual configuration of IP recursion and tunnel recursion on each network device is complex and error-prone. In this way, labor costs of IP recursion and tunnel recursion configuration are reduced, and network management accuracy and efficiency are improved.

Figure 4:
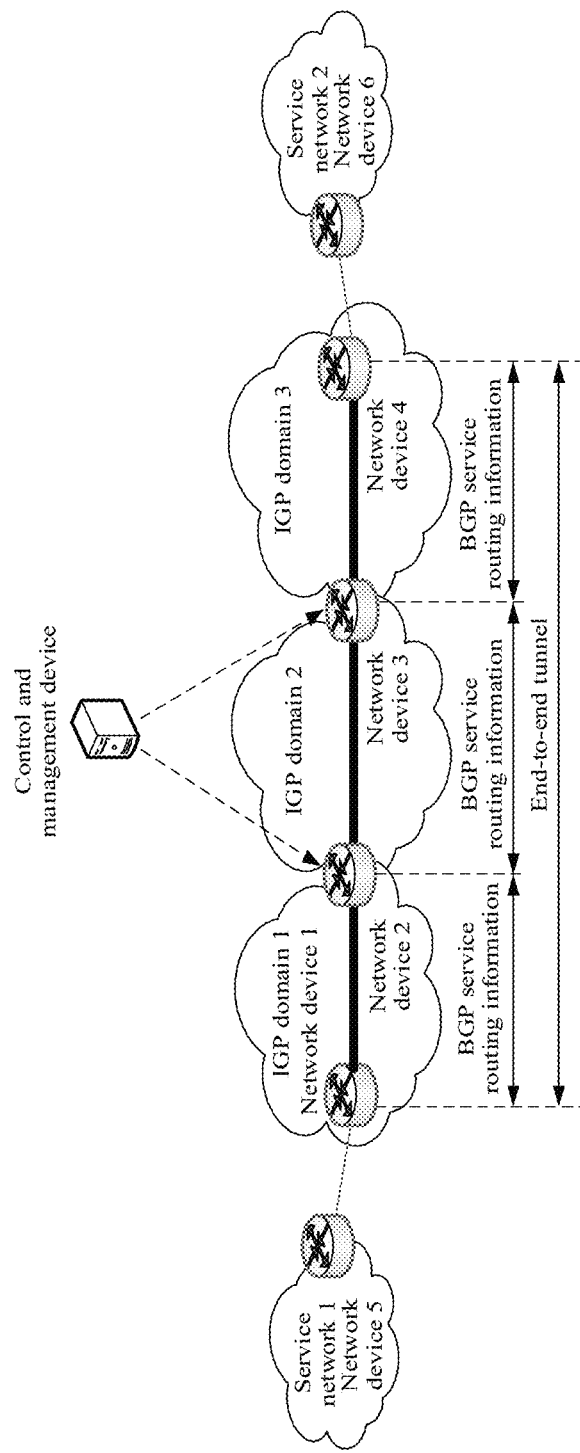
FIG. 4 is a schematic diagram of an application scenario in which an end-to-end tunnel bears a service according to an embodiment of this application.

(4) Route recursion is not performed on the next-hop address. FIG. 1 is used as an example. In some cases, the network device 1 may not perform any route recursion lookup by using the address (the next-hop address) of the network device 2. FIG. 4 to FIG. 5C describe a method in detail that in an application scenario in which an inter-domain end-to-end tunnel bears a service, after receiving BGP routing information from an upstream network device and before continuing to advertise the BGP routing information to a downstream network device, a non-border network device in an inter-domain network does not perform route recursion on a next-hop address. This helps normal creation of a service. It should be noted that, for explanation of the non-border network device, refer to the description of the inter-domain network in the following, and for explanation of upstream and downstream, refer to the description in FIG. 4. Details are not described herein.

By classifying attribute information into the IP recursion, the tunnel recursion, the IP recursion and the tunnel recursion, and no recursion, various route recursion manners are flexibly implemented, thereby improving route recursion flexibility.

In still another specific implementation, the attribute information is a BGP extended communities (Extended_Communities) attribute. For details about the Extended_Communities attribute, refer to request for comments RFC 4271 released by the IETF. Contents of this document and parts related to this aspect seem to be copied as a whole, and are incorporated by reference into this document. For a description of a contradiction or conflict that the document has with this application, a description of this application shall prevail. For brevity, details are not described herein again. This embodiment of the present disclosure extends the BGP extended communities attribute, and adds a new type to indicate to control route recursion of the next-hop address. As shown in FIG. 3, the BGP extended communities attribute includes a type field and a flag field. The type field indicates to control the route recursion of the next-hop address, the flag field controls the manner of performing the route recursion on the next-hop address, and the manner includes any one of the following: no recursion, the IP recursion, the tunnel recursion, and the IP recursion and the tunnel recursion.

By extending the new type in the BGP extended communities attribute to control the route recursion, a simple method with good scalability is provided. This helps to implement the disclosure solution easily and has good compatibility.

Further, the BGP extended communities attribute includes a value field, and the value field is used to control a specific manner of the IP recursion and the tunnel recursion. When the flag field indicates to perform no recursion on the next-hop address, the value field does not indicate any meaning, for example, a value may be 0. When the flag field indicates to perform the IP recursion on the next-hop address, the value field indicates the common IP recursion or the FlowSpec route recursion. For example, a value 1 indicates the common IP recursion, and a value 2 indicates the FlowSpec route recursion. When the flag field indicates to perform the tunnel recursion on the next-hop address, the value field indicates the MPLS LSP tunnel recursion, the RSVP-TE tunnel recursion, the SR-TE tunnel recursion, the SR-BE tunnel recursion, the GRE tunnel recursion, the IPv4 tunnel recursion, the IPv6 tunnel recursion, or the like. For example, a value 1 indicates the MPLS LSP tunnel recursion, a value 2 indicates the RSVP-TE tunnel recursion, a value of 3 indicates the SR-TE tunnel recursion, a value 4 indicates the SR-BE tunnel recursion, a value 5 indicates the GRE tunnel recursion, a value 6 indicates the IPv4 tunnel recursion, a value 7 indicates the IPv6 tunnel recursion, and so on.

Still further, the value field may be divided into a first value field and a second value field. The first value field indicates a type of the IP recursion, and the type of the IP recursion includes the common IP recursion or the FlowSpec route recursion. The second value field indicates a type of the tunnel recursion, and the tunnel recursion includes the MPLS LSP tunnel recursion, the RSVP-TE tunnel recursion, the SR-TE tunnel recursion, the SR-BE tunnel recursion, the GRE tunnel recursion, the IPv4 tunnel recursion, or the IPv6 tunnel recursion. It should be noted that a format in FIG. 3 is merely an example, and does not constitute a limitation on a location, a length, and the like of each field.

A specific type of the IP recursion or the tunnel recursion may be precisely controlled by using the value field. By further dividing the value field into the first value field and the second value field, the specific type of the IP recursion or the tunnel recursion may be separately controlled, and specific types of both the IP recursion and the tunnel recursion may also be precisely controlled, improving preciseness of route recursion control.

205: The second network device sends the BGP routing information to the first network device.

FIG. 1 is used as an example. The network device 2 advertises the BGP routing information including a destination address 10.10.10.10/32 and a next-hop address that is the address of the network device 2 to the network device 1.

206: The first network device receives the BGP routing information.

207: The first network device determines, based on the attribute information, the manner of performing the route recursion on the next-hop address.

FIG. 1 is used as an example. The network device 1 receives the BGP routing information, and determines, based on the attribute information, which route recursion is performed on the address (a next-hop address, 2.2.2.2/32) of the network device 2.

When the attribute information indicates to perform the IP recursion on the next-hop address, the first network device performs the IP recursion on the next-hop address.

FIG. 1 is used as an example. When determining to perform the IP recursion, the network device 1 performs the IP recursion on the address of the network device 2. For detailed descriptions, refer to the foregoing descriptions in 204. Details are not described herein again.

When the attribute information indicates to perform the tunnel recursion on the next-hop address, the first network device performs the tunnel recursion on the next-hop address.

FIG. 1 is used as an example. When determining to perform the tunnel recursion, the network device 1 performs the tunnel recursion on the address of the network device 2. For detailed descriptions, refer to the foregoing descriptions in 204. Details are not described herein again.

When the attribute information indicates to perform the IP recursion and the tunnel recursion on the next-hop address, the first network device performs the IP recursion and the tunnel recursion on the next-hop address. The IP recursion includes the common IP recursion or the FlowSpec route recursion. The tunnel recursion includes the MPLS LSP tunnel recursion, the RSVP-TE tunnel recursion, the SR-TE tunnel recursion, the SR-BE tunnel recursion, the GRE tunnel recursion, the IPv4 tunnel recursion, or the IPv6 tunnel recursion.

FIG. 1 is used as an example. When determining to perform the IP recursion and the tunnel recursion, the network device 1 performs the IP recursion and the tunnel recursion on the address of the network device 2. For detailed descriptions, refer to the foregoing descriptions in 204. Details are not described herein again.

When the attribute information indicates not to perform the route recursion on the next-hop address, the first network device does not perform the route recursion on the next-hop address.

FIG. 1 is used as an example. When determining not to perform recursion, the network device 1 does not perform the recursion on the address of the network device 2. For detailed descriptions, refer to the foregoing descriptions in 204.

In addition, FIG. 4 to FIG. 5C describe in detail a process in which a network device uses the attribute information to control not to perform route recursion in an application scenario in which an inter-domain end-to-end tunnel bears a service.

The inter-domain end-to-end tunnel is a tunnel that passes through at least two IGP network domains. The inter-domain end-to-end tunnel is a complete tunnel instead of a segmented tunnel formed by splicing a plurality of single-network-domain tunnels (a single-network-domain tunnel is a tunnel that passes through only one network domain). The inter-domain end-to-end tunnel is a tunnel including two end nodes and at least one intermediate node, and a node may also be referred to as a network device. The inter-domain end-to-end tunnel may be a bidirectional tunnel between the two end nodes, or may be a bidirectional tunnel formed by two unidirectional tunnels in opposite directions. For example, a unidirectional tunnel 1 from an end node A to an end node B and a unidirectional tunnel 2 from the end node B to the end node A form a bidirectional tunnel between the end node A and the end node B. The IGP network domain is a network on which routing information is exchanged by using an IGP, and is also referred to as an IGP domain. A network formed by the at least two IGP network domains is also referred to as an inter-domain network. Generally, one AS is one IGP network domain. However, sometimes, in one large-scale AS, performance of a network device is insufficient to support route calculation in such a large-scale network, or to facilitate maintenance and management, an operator also divides one AS into a plurality of IGP network domains. In this way, a performance or management requirement of the network device is met.

It should be noted that the inter-domain end-to-end tunnel may be a tunnel form of an SR-TE tunnel, an SR-BE tunnel, an RSVP-TE tunnel, an MPLS LSP tunnel, a GRE tunnel, an IPv4 tunnel (for example, in an IPv6 over IPv4 scenario), or an IPv6 tunnel (for example, in an IPv4 over IPv6 scenario). The tunnel forms are merely examples herein, and are not limited. In addition, the end-to-end tunnel may be established by using a centralized control and management device, or may be established in another manner.

The inter-domain network includes a plurality of network devices. In the inter-domain network, a network device connected to a device in a service network (for example, a service network 1 and a service network 2 shown in FIG. 4) is also referred to as a border network device, and a network device that is not connected to a device in the service network is also referred to as a non-border network device.

FIG. 4 is a schematic diagram of an application scenario in which an inter-domain end-to-end tunnel bears a service. The schematic diagram includes three IGP network domains: an IGP domain 1, an IGP domain 2, and an IGP domain 3. The IGP domain 1 includes a network device 1 and a network device 2, the IGP domain 2 includes the network device 2 and a network device 3, and the IGP domain 3 includes the network device 3 and a network device 4. The network device 2 connects the IGP domain 1 and the IGP domain 2, and the network device 3 connects the IGP domain 2 and the IGP domain 3. A control and management device controls all the IGP domains. An end-to-end tunnel that passes through the three IGP domains is established between the network device 1 and the network device 4, and the end-to-end tunnel may bear a service between the service network 1 and the service network 2. The end-to-end tunnel is also referred to as a public network tunnel or an outer tunnel. BGP peer relationships are established between the network device 1 and the network device 2, between the network device 2 and the network device 3, and between the network device 3 and the network device 4, and BGP service routing information is advertised between the BGP peers by using BGP update messages, to implement service creation. In a direction in which the network device 1 advertises BGP service routing information to the network 4, a former node is referred to as an upstream node of a latter node, and the latter node is referred to as a downstream node of the former node. For example, the network device 2 is a downstream node of the network device 1, and the network device 1 is an upstream node of the network device 2. The BGP service routing information includes a destination address and a next-hop address. The service may be a VPN service, an IPv6 service, or the like. For the VPN service, the service network 1 and the service network 2 are two site networks of the VPN, and the service routing information is VPN routing information. In this case, the destination address is a private network address of the VPN, for example, may be a VPN-IPv4 address, a VPN-IPv6 address, or a MAC address in the EVPN. For the IPv6 service, the service network 1 and the service network 2 are IPv6 networks, and the service routing information is IPv6 routing information, to implement IPv6 over IPv4. When the service routing information is IPv6 routing information, the destination address is an IPv6 address. It should be noted that when the destination address is an IP address (including an IPv4 address and the IPv6 address), the destination address is also referred to as an IP address prefix or an IP prefix. It should be noted that, in a description of FIG. 4 to FIG. 5C, BGP routing information is also referred to as BGP service routing information.

In the present disclosure, a method implemented in an application scenario in which an inter-domain end-to-end tunnel (also referred to as an inter-domain tunnel below) bears a service shown in FIG. 4 is consistent with that described in FIG. 1 to FIG. 3. The second network device in FIG. 2 is the network device 1 in FIG. 4, the first network device in FIG. 2 is the network device 2, the network device 3, or the network device 4 in FIG. 4, and the control and management device in FIG. 2 is the control and management device in FIG. 4. In an inter-domain network in which an inter-domain tunnel is located, to ensure reliability of creating a service born by the inter-domain tunnel, when the service is associated with the inter-domain tunnel, it needs to ensure that the inter-domain tunnel is reachable. Therefore, the end node network device 4 of the inter-domain tunnel needs to recurse, by using an address of the end node network device 1, to an inter-domain tunnel from the network device 4 to the network device 1. If the recursion succeeds, the service is associated with the inter-domain tunnel, to complete service creation. If the recursion fails, service creation is terminated.

To recurse from a tail-end node (for example, the network device 4) of an inter-domain tunnel to a head-end node (for example, the network device 1), an address of the head-end node needs to be carried in a next-hop address in BGP service routing information, and is advertised to the tail-end node of the inter-domain tunnel with spread of the BGP service routing information. Intermediate nodes (such as the network device 2 and the network device 3) do not change the next-hop address to addresses of the intermediate nodes when processing the BGP service routing information. In addition, in this case, the network device 2 and the network device 3 do not use an address (as a next-hop address) of the network device 1 to perform route recursion, to avoid a service creation failure caused because advertisement of the BGP service routing information is terminated due to a recursive route lookup failure, and advertised information cannot reach the network device 4. For example, if the network device 3 in FIG. 1 performs IP recursion using the address of the network device 1 as a next-hop address, a routing entry corresponding to a destination address that is the address of the network device 1 cannot be found. Because the network device 1 is a device in the IGP domain 1, a route of the network device 1 is only in a range of the IGP domain 1, and is only in a routing table of the IGP domain 1. There is no route to the network device 1 in the IGP domain 2. To be specific, there is no routing entry corresponding to the address of the network device 1 in a routing table of the IGP domain 2. If the network device 3 performs tunnel recursion using the address of the network device 1 as the next-hop address, because the network device 3 is located at an intermediate node of the inter-domain end-to-end tunnel, the network device 3 cannot be recurred to the inter-domain end-to-end tunnel. To be specific, a tunnel identifier corresponding to the address (the next-hop address) of the network device 1 cannot be found in a tunnel forwarding table. Therefore, the route recursion performed by the network device 3 cannot succeed.

Attribute information is carried in the BGP service routing information, and a recursive routing manner is spread to a corresponding network device with spread of the advertised message. A more precise control manner is provided, to reduce labor costs, and improve efficiency and accuracy. FIG. 4 is used as an example. The network device 1 obtains, directly or based on policy information (for example, the policy message is obtained by receiving a message from the control and management device or a configuring a command line by a user), BGP service routing information that carries attribute information indicating not to perform the route recursion (a destination address is an address in the service network 1, and a next-hop address is the address of the network device 1), and sends the BGP service routing information to the network device 2. After receiving the BGP routing information, the network device 2 parses the attribute information, and does not perform the route recursion on the address (the next-hop address) of the network device 1 based on the indication of the attribute information. In a similar way, the network device 2 continues to send the BGP service routing information to the network device 3, and the network device 3 does not perform the route recursion on the address of the network device 1 based on the attribute information. After receiving the BGP service routing information, the network device 4 does not perform the route recursion based on the attribute information. It should be noted that the network device 4 does not perform recursion based on the attribute information when receiving the BGP service routing information. However, recursive route lookup needs to be added during creation of a service forwarding entry, to ensure that a service is created when the inter-domain tunnel is reachable, improving creation reliability.

Figure 5A:
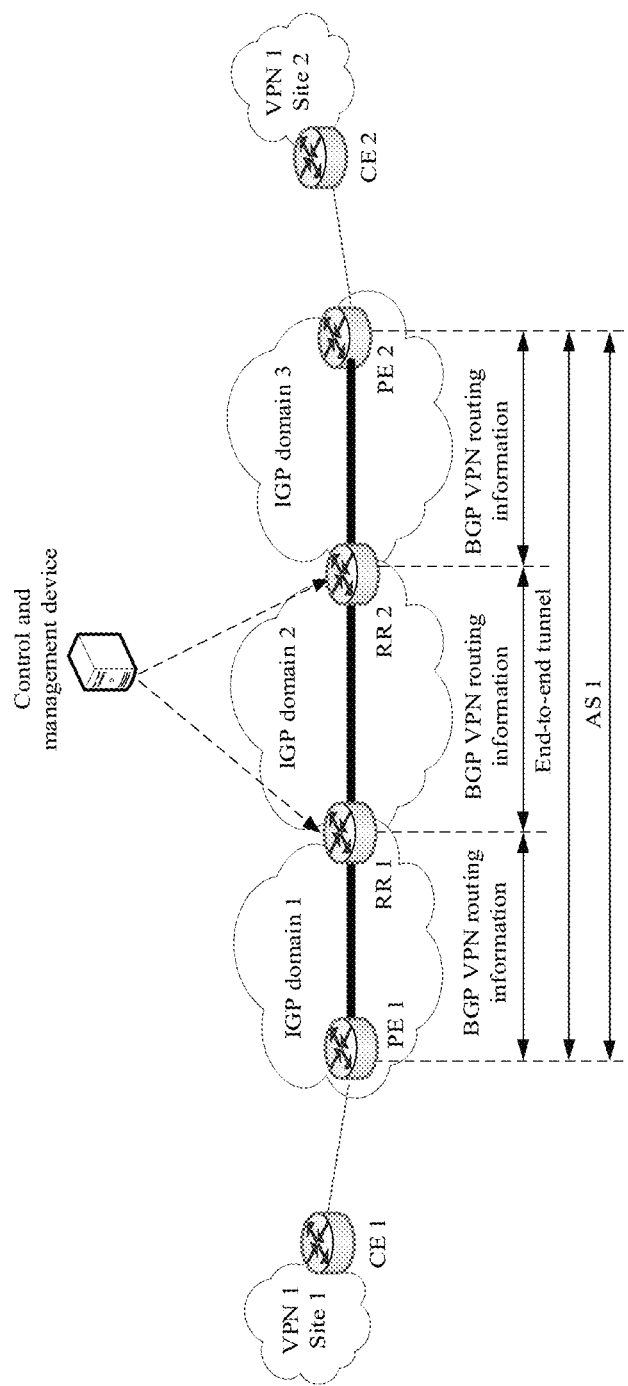
FIG. 5A is a schematic diagram of an application scenario in which an end-to-end tunnel bears a virtual private network (VPN) service according to an embodiment of this application.
Figure 5B:
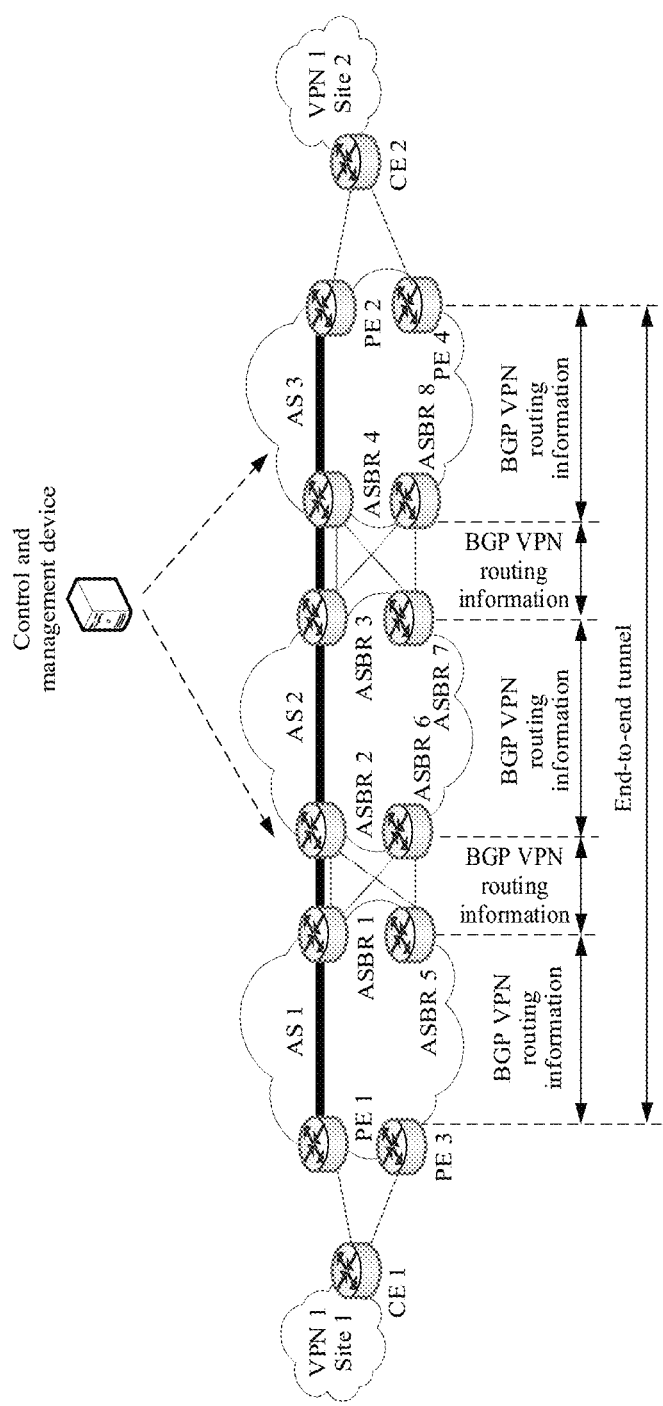
FIG. 5B is a schematic diagram of another application scenario in which an end-to-end tunnel bears a VPN service according to an embodiment of this application.
Figure 5C:
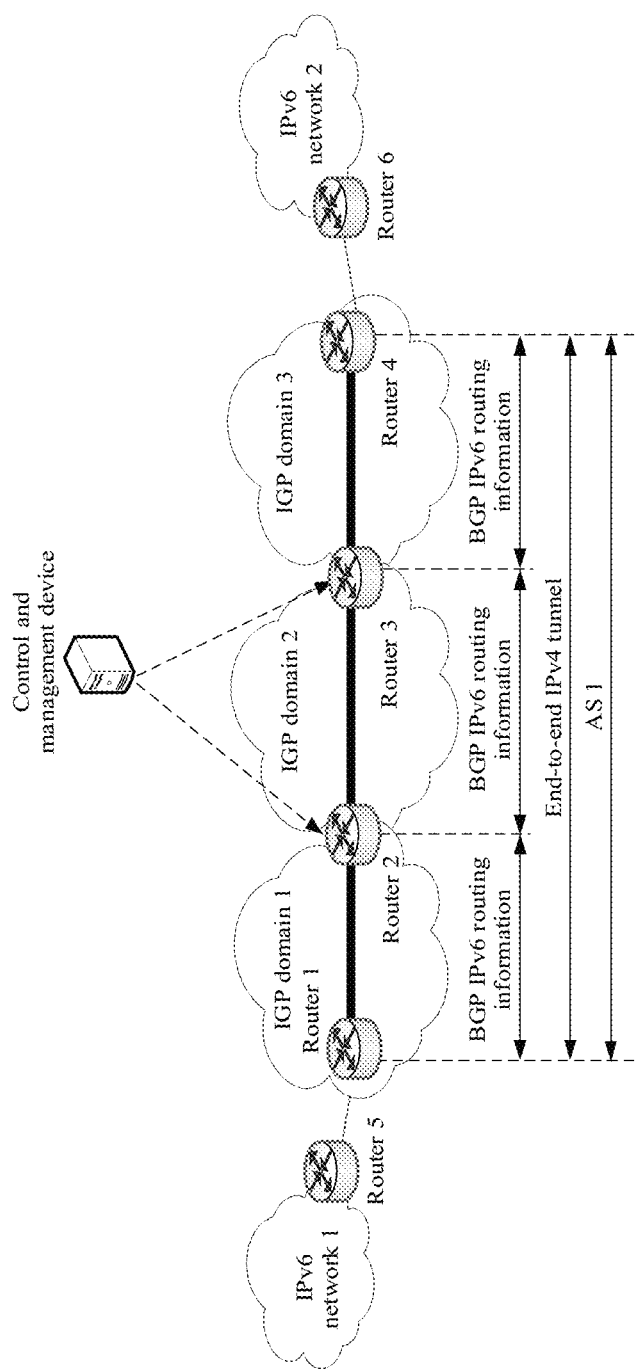
FIG. 5C is a schematic diagram of an application scenario in which an end-to-end tunnel bears an IPv6 service according to an embodiment of this application.

To better understand specific application scenarios in which an inter-domain end-to-end tunnel bears various services, FIG. 5A to FIG. 5C show specific application scenarios for bearing a VPN service and an IPv6 service by using examples. The following further explains and describes the embodiments of the present disclosure with reference to specific application scenarios.

FIG. 5A is a schematic diagram of an application scenario in which an inter-domain end-to-end tunnel bears a VPN service. In this scenario, an AS includes three IGP network domains, and a VPN site accesses a network of the AS through a customer edge (CE) device (a CE device is referred to as CE). A control and management device controls all the IGP domains. An end-to-end tunnel that passes through the three IGP network domains is established between provider edge (PE) devices (a PE device is referred to as PE) to bear a VPN service. For example, an SR-TE tunnel (a public network tunnel) is established between a PE 1 and a PE 2, a CE 1 and a CE 2 are respectively located in a site 1 and a site 2 of a VPN 1, and the SR-TE tunnel between the site 1 and the site 2 may bear a service of the VPN 1. BGP peer relationships are established between the PE 1 and a route reflector (RR) 1, between the RR 1 and an RR 2, and between the RR 2 and the PE 2. VPN routing information of the CE 1 and the CE 2 is advertised and spread between BGP peers of the PE 1-the RR 1-the RR 2-the PE 2 by using a BGP update message. Therefore, a VPN private tunnel (namely, an inner tunnel) is established over the public network tunnel (namely, an outer tunnel) between the PE 1 and the PE 2, to implement inter-domain service interworking between the site 1 and the site 2 in the VPN 1.

The method implemented in the VPN service scenario shown in FIG. 5A in the present disclosure is consistent with that in FIG. 4, and a difference lies in that advertised BGP service routing information is specifically a private network route in the VPN 1. The second network device in FIG. 2 the PE 1 in FIG. 5A, the first network device in FIG. 2 is the RR 1, the RR 2, or the PE 2 in FIG. 5A, and the control and management device in FIG. 2 is the control and management device in FIG. 5A. As non-border network devices in an inter-domain network, the RR 1 and the RR 2 receive the BGP service routing information, obtain attribute information used to control a route recursion manner from the BGP service routing information, and do not perform recursive route lookup based on an indication of the attribute information. When advertising the BGP VPN routing information, the RR 1 and the RR 2 do not update next-hop addresses to addresses of the RR 1 and the RR 2. As a border network device in the inter-domain network, the PE 1 needs to update a next-hop address to an address of the PE 1 when advertising the BGP VPN routing information. As a border network device in the inter-domain network, the PE 2 needs to perform route recursion when creating a VPN service forwarding entry, to ensure that an inter-domain end-to-end tunnel from the PE 2 to the PE 1 that is recurred is reachable. In this way, it can be ensured that the BGP VPN routing information advertised by the PE 1 can be normally spread to the PE 2 through the RR 1 and the RR 2, and a VPN 1 service is created when it is ensured that the end-to-end tunnel from the PE 2 to the PE 1 is reachable. This helps reliable creation of the VPN 1 service.

FIG. 5B is a schematic diagram of another application scenario in which an inter-domain end-to-end tunnel bears a VPN service. This scenario is similar to that in FIG. 5A. A difference lies in that this scenario includes three ASs, and the ASs are interconnected through autonomous system border routers (ASBR). Each AS is one IGP network domain, or a plurality of ASs may be considered as one IGP network domain. A control and management device controls all the ASs. An end-to-end tunnel that passes through the three ASs is established between PEs to bear the VPN service. For example, an RSVP-TE tunnel (public network tunnel) is established between a PE 1 and a PE 2. The RSVP-TE tunnel may bear a VPN 1 service between a site 1 and a site 2. ACE 1 is connected to the PE 1 and a PE 3 in the AS 1, and a CE 2 is connected to the PE 2 and a PE 4 in the AS 3. The PE 1 and the PE 3 establish BGP peer relationships with an ASBR 1 and an ASBR 5 respectively; the ASBR 1 and the ASBR 5 establish BGP peer relationships with an ASBR 3 and an ASBR 7 respectively; the ASBR 3 and the ASBR 7 establish BGP peer relationships with an ASBR 4 and an ASBR 8 respectively; and the ASBR 4 and the ASBR 8 establish BGP peer relationships with the PE 2 and the PE 4 respectively. VPN routing (also referred to as private network routing) information between the site 1 and the site 2 is carried in BGP update messages, and is advertised and spread by these BGP peers. Therefore, a VPN private tunnel (namely, an inner tunnel) is established over the public network tunnel (namely, an outer tunnel) between the PE 1 and the PE 2, to implement inter-domain service interworking between the site 1 and the site 2 in the VPN 1. It should be noted that, similar to that the CE may be dual-homed to the PEs, to ensure reliability, a plurality of inter-domain end-to-end tunnels may also be established between the PE 1 and the PE 3 and between the PE 2 and the PE 4. Only one tunnel is used as an example herein, but no limitation is imposed.

The method implemented in the VPN service scenario shown in FIG. 5B in the present disclosure is consistent with that in FIG. 4 and FIG. 5A, and is used in an inter-AS domain scenario. The second network device in FIG. 2 may be the PE 1 or the PE 3 in FIG. 5B, the first network device in FIG. 2 is the ASBR 1, the ASBR 2, the ASBR 3, the ASBR 4, the ASBR 5, the ASBR 6, the ASBR 7, the ASBR 8, the PE 2, or the PE 4 in FIG. 5B, and the control and management device in FIG. 2 is the control and management device in FIG. 5B. For a specific method, refer to the foregoing related part. For brevity, details are not described again.

FIG. 5C is a schematic diagram of an application scenario in which an inter-domain end-to-end tunnel bears an IPv6 service. In this scenario, an AS includes three IGP network domains, which are IPv4-based networks. An IPv6 network 1 and an IPv6 network 2 are connected to a network of the AS. A router 5 and a router 6 are located in the IPv6 network 1 and the IPv6 network 2 respectively. A control and management device controls all the network domains. An end-to-end IPv4 tunnel that passes through the three IGP network domains is established between a router 1 and a router 4 to bear the IPv6 service. BGP peer relationships are established between the router 1 and the router 2, between the router 2 and a router 3, and between the router 3 and a router 4. IPv6 routing information of the IPv6 network 1 and the IPv6 network 2 is advertised and spread by the BGP peers of the router 1-the router 2-the router 3-the router 4 by using BGP update messages. In this way, an IPv6 tunnel (namely, an inner tunnel) is established over the IPv4 tunnel (namely, the outer tunnel) between the router 1 and the router 4, thereby implementing interconnection between the IPv6 network 1 and the IPv6 network 2.

The method implemented in the IPv6 service scenario shown in FIG. 5C in the present disclosure is consistent with that in FIG. 4, and a difference lies in that advertised BGP service routing information is specifically an IPv6 address in the IPv6 network, and the tunnel of route recursion is an inter-domain end-to-end IPv4 tunnel. The second network device in FIG. 2 may be the router 1 in FIG. 5C, the first network device in FIG. 2 is the router 2, the router 3, and the router 4 in FIG. 5C, and the control and management device in FIG. 2 is the control and management device in FIG. 5C. As non-border network devices in an inter-domain network, the router 2 and the router 3 receive the BGP service routing information, obtain attribute information used to control a route recursion manner from the BGP service routing information, and do not perform recursive route lookup based on an indication of the attribute information. When advertising BGP IPv6 routing information, the router 2 and the router 3 do not update next-hop addresses to address of the router 2 and the router 3. As a border network device in an inter-domain network, the router 4 may not perform recursive route lookup based on an indication of the attribute information when receiving the BGP IPv6 service routing information. However, the router 4 needs to perform route recursion when creating an IPv6 over IPv4 service forwarding entry, to ensure that an inter-domain end-to-end tunnel from the router 4 to the router 1 that is recurred is reachable. In this way, it can be ensured that the BGP IPv6 routing information advertised by the router 1 can be normally spread to the router 4 through the router 2 and the router 3, and an IPv6 over IPv4 service is created when it is ensured that the end-to-end tunnel from the router 4 to the router 1 is reachable. This helps reliable creation of the IPv6 over IPv4 service.

It should be noted that FIG. 5C uses an IPv6 over IPv4 service scenario as an example. An IPv4 over IPv6 service scenario is in a similar way, and a difference is that an inter-domain tunnel is an IPv6 tunnel, and advertised BGP service routing information is IPv4 routing information. For brevity, details are not described again.

Figure 6:
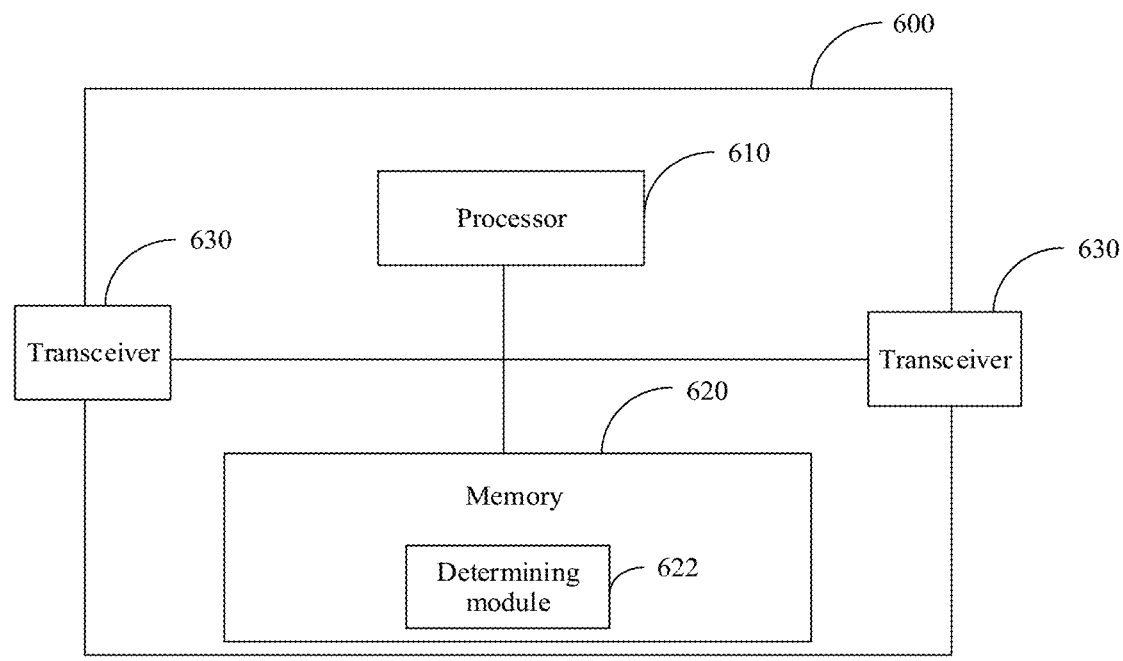
FIG. 6 is a schematic diagram of a first network device according to an embodiment of this application.

FIG. 6 is a schematic diagram of a network device 600 according to an embodiment of this application. The network device 600 is used as a first network device, including a processor 610, a memory 620 coupled to the processor 610, and a transceiver 630. The processor 610 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 610 may be one processor, or may include a plurality of processors. The transceiver 630 is configured to receive BGP routing information from a second network device, and send the packet to the processor 610, for a subsequent operation. The BGP routing information includes a destination address, a next-hop address for the destination address, and attribute information. The attribute information indicates a manner of performing route recursion on the next-hop address by the first network device. The memory 620 may include a volatile memory, for example, a random-access memory (RAM). The memory may alternatively include a non-volatile memory, for example, a read-only memory (ROM), a flash memory, a hard disk drive (HDD), or a solid-state drive (SSD). The memory may alternatively include a combination of the foregoing types of memories. The memory 620 stores a computer-readable instruction, and the computer-readable instruction includes at least one software module, for example, a determining module 622. After executing each software module, the processor 610 may perform a corresponding operation based on an indication of each software module. In this embodiment, an operation performed by a software module is actually an operation performed by the processor 610 based on the indication of the software module. The determining module 622 may be configured to determine, based on the attribute information, the manner of performing route recursion on the next-hop address. In addition, after executing the computer-readable instruction in the memory 620, the processor 610 may perform, based on an indication of the computer-readable instruction, all operations that can be performed by the first network device, for example, operations that the first network device performs in the embodiments corresponding to FIG. 1 to FIG. 5C.

Figure 7:
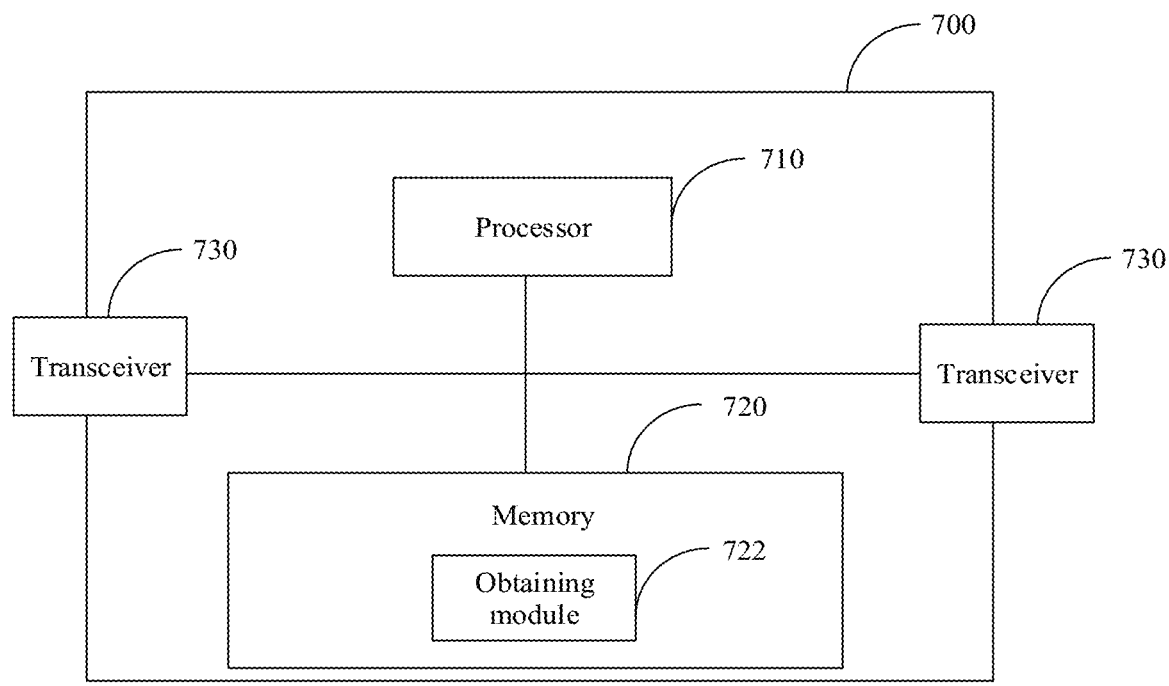
FIG. 7 is a schematic diagram of a first network device according to an embodiment of this application.

FIG. 7 is a schematic diagram of a network device 700 according to an embodiment of this application. The network device 700 is used as a second network device, including a processor 710, a memory 720 coupled to the processor 710, and a transceiver 730. The processor 710 may be a CPU, an NP, or a combination of a CPU and an NP. The processor may alternatively be an ASIC, a PLD, or a combination thereof. The PLD may be a CPLD, an FPGA, GAL, or any combination thereof. The processor 710 may be one processor, or may include a plurality of processors. The transceiver 730 is configured to send BGP routing information to the first network device according to an operation instruction of the processor 710. The memory 720 may include a volatile memory, for example, a RAM. The memory may alternatively include a non-volatile memory, for example, a ROM, a flash memory, an HDD, or an SSD. The memory may alternatively include a combination of the foregoing types of memories. The memory 720 stores a computer-readable instruction, and the computer-readable instruction includes at least one software module, for example, an obtaining module 722. After executing each software module, the processor 710 may perform a corresponding operation based on an indication of each software module. In this embodiment, an operation performed by a software module is actually an operation performed by the processor 710 based on the indication of the software module. The obtaining module 722 may be configured to obtain the BGP routing information, where the BGP routing information includes a destination address, a next-hop address for the destination address, and attribute information, and the attribute information indicates a manner of performing route recursion on the next-hop address by the first network device. In addition, after executing the computer-readable instruction in the memory 720, the processor 710 may perform, based on an indication of the computer-readable instruction, all operations that can be performed by the second network device, for example, operations that the second network device performs in the embodiments corresponding to FIG. 1 to FIG. 5C.

Figure 8:
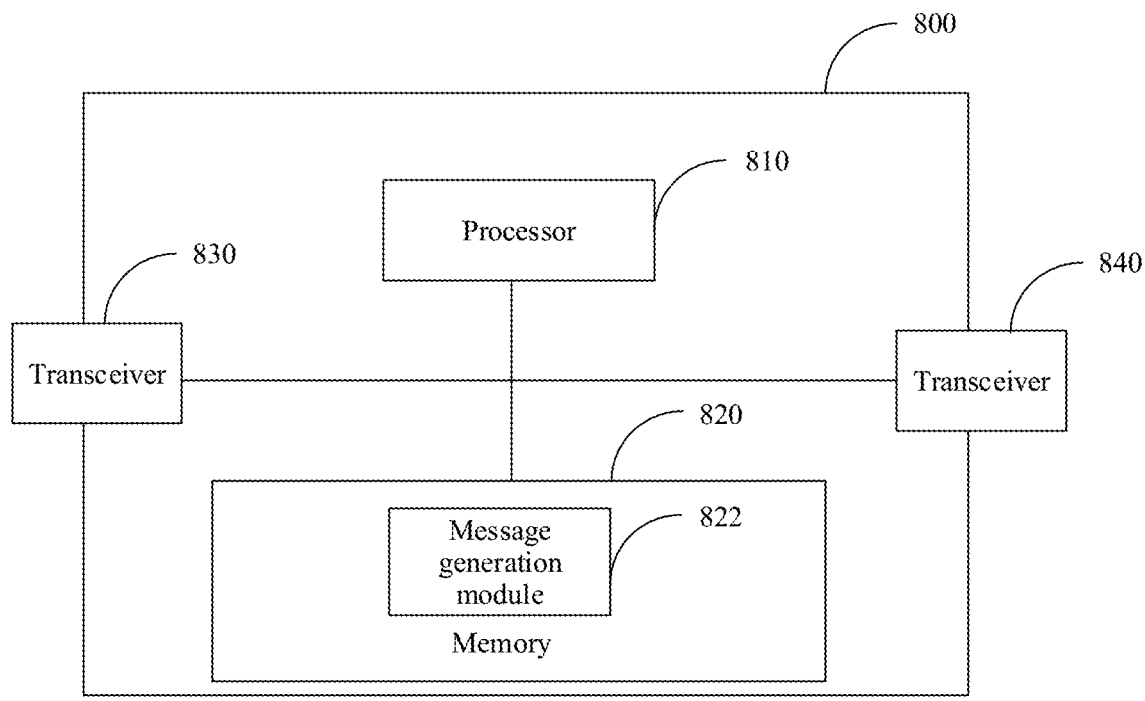
FIG. 8 is a schematic diagram of a control and management device according to an embodiment of this application.

FIG. 8 is a schematic diagram of a control and management device 800 according to an embodiment of this application. The control and management device 800 includes a processor 810, a memory 820 coupled to the processor 810, and a transceiver 830. The processor 810 may be a CPU, an NP, or a combination of a CPU and an NP. The processor may alternatively be an ASIC, a PLD, or a combination thereof. The PLD may be a CPLD, an FPGA, GAL, or any combination thereof. The processor 810 may be one processor, or may include a plurality of processors. The memory 820 may include a volatile memory, for example, a RAM. The memory may alternatively include a non-volatile memory, for example, a ROM, a flash memory, an HDD, or an SSD. The memory may alternatively include a combination of the foregoing types of memories. The memory 820 stores a computer-readable instruction, and the computer-readable instruction includes at least one software module, for example, a message generation module 822. After executing each software module, the processor 810 may perform a corresponding operation based on an indication of each software module. In this embodiment, an operation performed by a software module is actually an operation performed by the processor 810 based on the indication of the software module. The message generation module 822 is configured to generate a message, where the message includes policy information, and the policy information indicates a second network device to add attribute information to BGP routing information to be advertised to the first network device. The BGP routing information includes a destination address, a next-hop address for the destination address, and the attribute information. The attribute information indicates a manner of performing route recursion on the next-hop address by the first network device. The transceiver 830 is used to send the message to the second network device. In addition, after executing the computer-readable instruction in the memory 820, the processor 810 may perform, based on an indication of the computer-readable instruction, all operations that can be performed by the control and management device, for example, operations that the control and management device performs in the embodiments corresponding to FIG. 1 to FIG. 5C.

Figure 9:
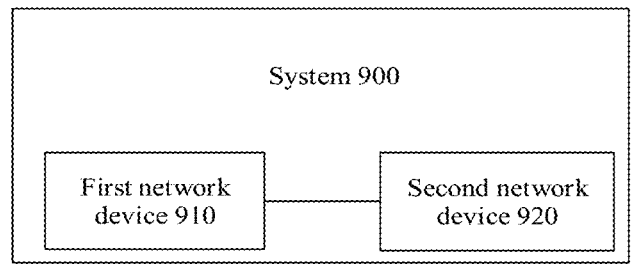
FIG. 9 is a schematic diagram of a system according to an embodiment of this application.

As shown in FIG. 9, a system 900 includes a first network device 910 and a second network device 920. The first network device 910 is the first network device in FIG. 6, and the second network device 920 is the second network device in FIG. 7. For detailed descriptions of the devices in the system 900, refer to related descriptions in FIG. 6 and FIG. 7. Details are not described herein again.

Figure 10:
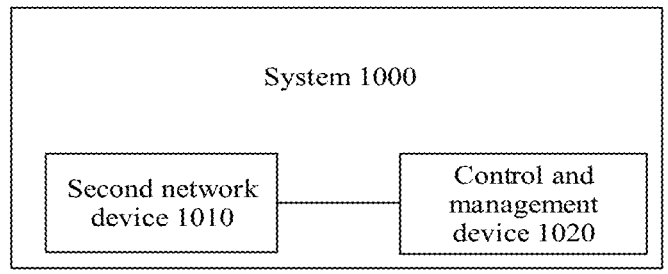
FIG. 10 is a schematic diagram of another system according to an embodiment of this application.

As shown in FIG. 10, a system 1000 includes a second network device 1010 and a control and management device 1020. The second network device 1010 is the second network device in FIG. 7, and the control and management device 1020 is the control and management device in FIG. 8. For detailed descriptions of the devices in the system 1000, refer to related descriptions in FIG. 7 and FIG. 8. Details are not described herein again.

It should be noted that in the embodiments of the present disclosure, "first" in the first network device, and "second" in the second network device are merely used to distinguish the two network devices, and do not indicate that there is a sequence, a hierarchy, or another dependency relationship between the two network devices.

It should be understood that a person skilled in the art can obtain, on a basis of reading this application, combinations of optional features, steps, or methods described in the embodiments in this application without creative efforts, and all of the combinations belong to the embodiments disclosed in this application. For simple description or writing, different combinations are not described.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

The foregoing descriptions are merely example specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A first network device, comprising:
a processor; and
a memory coupled to the processor and configured to store instructions that, when executed by the processor, cause the first network device to be configured to:
receive Border Gateway Protocol (BGP) routing information from a second network device, wherein the BGP routing information comprises a destination address and a next-hop address for the destination address;
determine a manner of performing route recursion on the next-hop address based on attribute information, wherein the manner of performing route recursion comprises either Internet Protocol (IP) recursion or tunnel recursion, wherein the attribute information comprises a BGP extended communities attribute, wherein the BGP extended communities attribute comprises a type field, a flag field, a first value field, and a second value field, wherein the type field indicates to control the route recursion of the next hop address, wherein the flag field controls the manner of performing the route recursion of the next-hop address, wherein the first value field indicates a first type of the IP recursion, and wherein the second value field indicates a second type of the tunnel recursion;
perform the IP recursion on the next-hop address when the attribute information indicates to perform the IP recursion on the next-hop address, wherein the IP recursion comprises determining a direct next-hop address; and
perform the tunnel recursion on the next-hop address when the attribute information indicates to perform the tunnel recursion, wherein the tunnel recursion comprises determining a tunnel identifier.

2. The first network device of claim 1, wherein the instructions further cause the first network device to be configured to skip performing the route recursion on the next-hop address when the attribute information indicates not to perform the route recursion.

3. The first network device of claim 1, wherein the IP recursion comprises common IP recursion or flow specification (FlowSpec) route recursion.

4. The first network device of claim 1, wherein the tunnel recursion comprises multi-protocol label switching (MPLS) label switched path (LSP) tunnel recursion, resource reservation protocol-traffic engineering (RSVP-TE) tunnel recursion, segment routing-traffic engineering (SR-TE) tunnel recursion, segment routing-best effort (SR-BE) tunnel recursion, generic routing encapsulation (GRE) tunnel recursion, Internet Protocol version 4 (IPv4) tunnel recursion, or Internet Protocol version 6 (IPv6) tunnel recursion.

5. The first network device of claim 1, wherein the manner of performing route recursion further comprises both the IP recursion and the tunnel recursion, wherein the instructions further cause the first network device to be configured to perform the IP recursion and the tunnel recursion on the next-hop address when the attribute information indicates to perform the IP recursion and the tunnel recursion on the next-hop address, wherein the first type of the IP recursion comprises common IP recursion or FlowSpec route recursion, and wherein the second type of the tunnel recursion comprises multi-protocol label switching (MPLS LSP) tunnel recursion, resource reservation protocol-traffic engineering (RSVP-TE) tunnel recursion, segment routing-traffic engineering (SR-TE) tunnel recursion, segment routing-best effort (SR-BE) tunnel recursion, generic routing encapsulation (GRE) tunnel recursion, Internet Protocol version 4 (IPv4) tunnel recursion, or Internet Protocol version 6 (IPv6) tunnel recursion.

6. The first network device of claim 1, wherein the IP recursion comprises a common IP recursion type.

7. The first network device of claim 1, wherein the IP recursion comprises a FlowSpec route recursion type.

8. The first network device of claim 1, wherein the tunnel recursion comprises a multi-protocol label switching (MPLS LSP) tunnel recursion type.

9. The first network device of claim 1, wherein the tunnel recursion comprises a resource reservation protocol-traffic engineering (RSVP-TE) tunnel recursion type.

10. The first network device of claim 1, wherein the tunnel recursion comprises a segment routing-traffic engineering (SR-TE) tunnel recursion type.

11. The first network device of claim 1, wherein the tunnel recursion comprises an IP tunnel recursion type.

12. A system, comprising:
a first network device comprising:
a first processor and a first memory; and
a second network device comprising:
a second processor; and a second memory coupled to the second processor and configured to store instructions that, when executed by the second processor, cause the second network device to be configured to:
obtain Border Gateway Protocol (BGP) routing information, wherein the BGP routing information comprises a destination address, a next-hop address for the destination address, and attribute information, wherein the attribute information indicates a manner of performing route recursion on the next-hop address by the first network device, wherein the manner of performing route recursion comprises either Internet Protocol (IP) recursion or tunnel recursion, wherein the attribute information comprises a BGP extended communities attribute, wherein the BGP extended communities attribute comprises a type field, a flag field, a first value field, and a second value field, wherein the type field indicates to control the route recursion of the next hop address, wherein the flag field controls the manner of performing the route recursion of the next-hop address, wherein the first value field indicates a first type of the IP recursion, and wherein the second value field indicates a second type of the tunnel recursion; and
send the BGP routing information to the first network device;
wherein the first network device is configured to:
perform the IP recursion on the next-hop address when the attribute information indicates to perform the IP recursion on the next-hop address, wherein the IP recursion comprises determining a direct next-hop address; and
perform the tunnel recursion on the next-hop address when the attribute information indicates to perform the tunnel recursion, wherein the tunnel recursion comprises determining a tunnel identifier.

13. The system of claim 12, wherein the manner of performing the route recursion on the next-hop address comprises one of:
skipping performing the route recursion on the next-hop address;

performing the IP recursion on the next-hop address, wherein the first type of the IP recursion comprises common IP recursion or FlowSpec route recursion;

performing the tunnel recursion on the next-hop address, wherein the second type of the tunnel recursion comprises multi-protocol label switching (M-PLS) label switched path (LSP) tunnel recursion, resource reservation protocol-traffic engineering (RSVP-TE) tunnel recursion, segment routing-traffic engineering (SR-TE) tunnel recursion, segment routing-best effort (SR-BE) tunnel recursion, generic routing encapsulation (GRE) tunnel recursion, Internet Protocol version 4 (IPv4) tunnel recursion, or Internet Protocol version 6 (IPv6) tunnel recursion; or performing the IP recursion and the tunnel recursion on the next-hop address.

14. The system of claim 12, wherein before obtaining the BGP routing information, the instructions further cause the second network device to be configured to obtain policy information, and wherein the policy information indicates for the second network device to add the attribute information to the BGP routing information that is to be advertised to the first network device.

15. The system of claim 14, wherein the instructions further cause the second network device to be configured to obtain the BGP routing information based on the policy information.

16. The system of claim 14, wherein the policy information further comprises specified address information, wherein the specified address information indicates an address set, and wherein the policy information indicates for the second network device to add the attribute information to the BGP routing information that comprises the destination address and that is to be advertised to the first network device.

17. The system of claim 16, wherein the instructions further cause the second network device to be configured to obtain the BGP routing information based on the policy information when the destination address is in the address set.

18. The system of claim 14, wherein the second network device obtains the policy information by:
obtaining the policy information based on a command line configuration;
receiving a message from a control and management device, wherein the message comprises the policy information; and
running algorithm software to automatically generate the policy information.

19. A system, comprising:
a first network device comprising a first processor and a first memory;
a second network device comprising a second processor and a second memory; and
a control and management device comprising a third processor; and
a third memory coupled to the third processor and configured to store instructions that, when executed by the third processor, cause the control and management device to be configured to:
generate a message comprising policy information, wherein the policy information indicates for the second network device to add attribute information to Border Gateway Protocol (BGP) routing information that is to be advertised to the first network device, wherein the BGP routing information comprises a destination address, a next-hop address for the destination address, and the attribute information, wherein the attribute information indicates a manner of performing route recursion on the next-hop address by the first network device, wherein the manner of performing route recursion comprises either Internet Protocol (IP) recursion or tunnel recursion, wherein the attribute information comprises a BGP extended communities attribute, wherein the BGP extended communities attribute comprises a type field, a flag field, a first value field, and a second value field, wherein the type field indicates to control the route recursion of the next hop address, wherein the flag field controls the manner of performing the route recursion of the next-hop address, wherein the first value field indicates a first type of the IP recursion, and wherein the second value field indicates a second type of the tunnel recursion; and
send the message to the second network device;
where the second network device is configured to send the BGP routing information to the first network device;
wherein the first network device is configured to:
perform the IP recursion on the next-hop address when the attribute information indicates to perform the IP recursion on the next-hop address, wherein the IP recursion comprises determining a direct next-hop address; and
perform the tunnel recursion on the next-hop address when the attribute information indicates to perform the tunnel recursion, wherein the tunnel recursion comprises determining a tunnel identifier.

20. The system of claim 19, wherein the policy information further comprises specified address information, wherein the specified address information indicates an address set, and wherein the policy information indicates for the second network device to add the attribute information to the BGP routing information that comprises the destination address in the address set and that is to be advertised to the first network device.

* * * * *